April 11, 1950 RENÉ LUCIEN LEVY 2,503,498
ALSO KNOWN AS
RENÉ LUCIEN
COMBINED HYDRAULIC AND EMERGENCY
MECHANICAL REMOTE CONTROL
Filed March 24, 1948 7 Sheets-Sheet 1
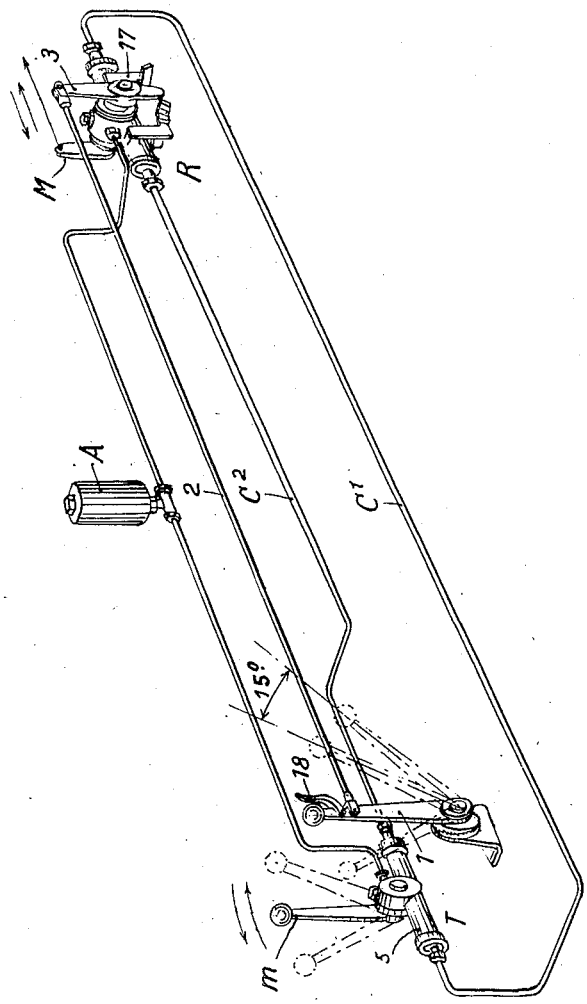
Inventor
René Lucien Levy
Also known as René Lucien
By Glascock Downing Hubbell
Attys.

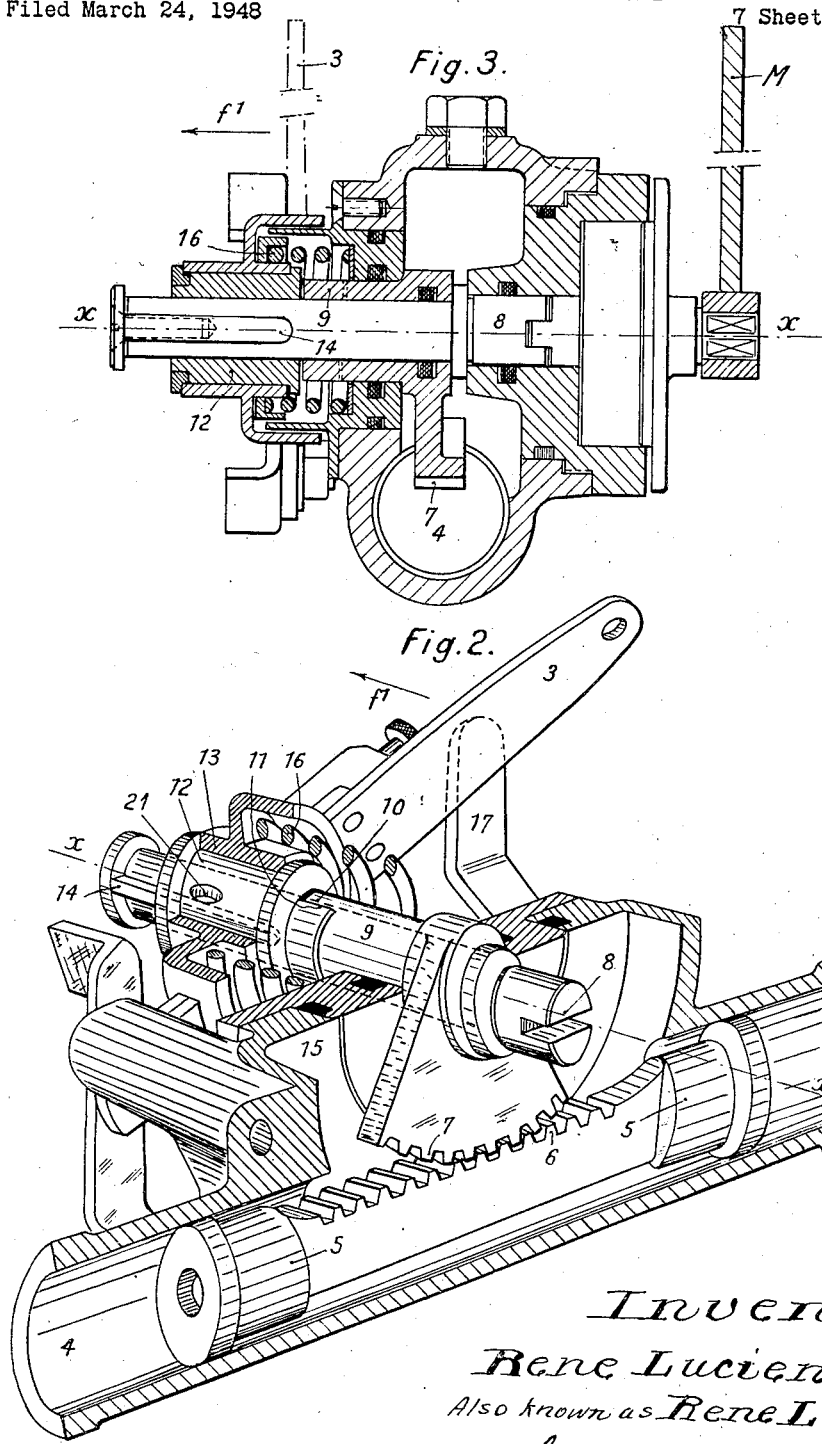

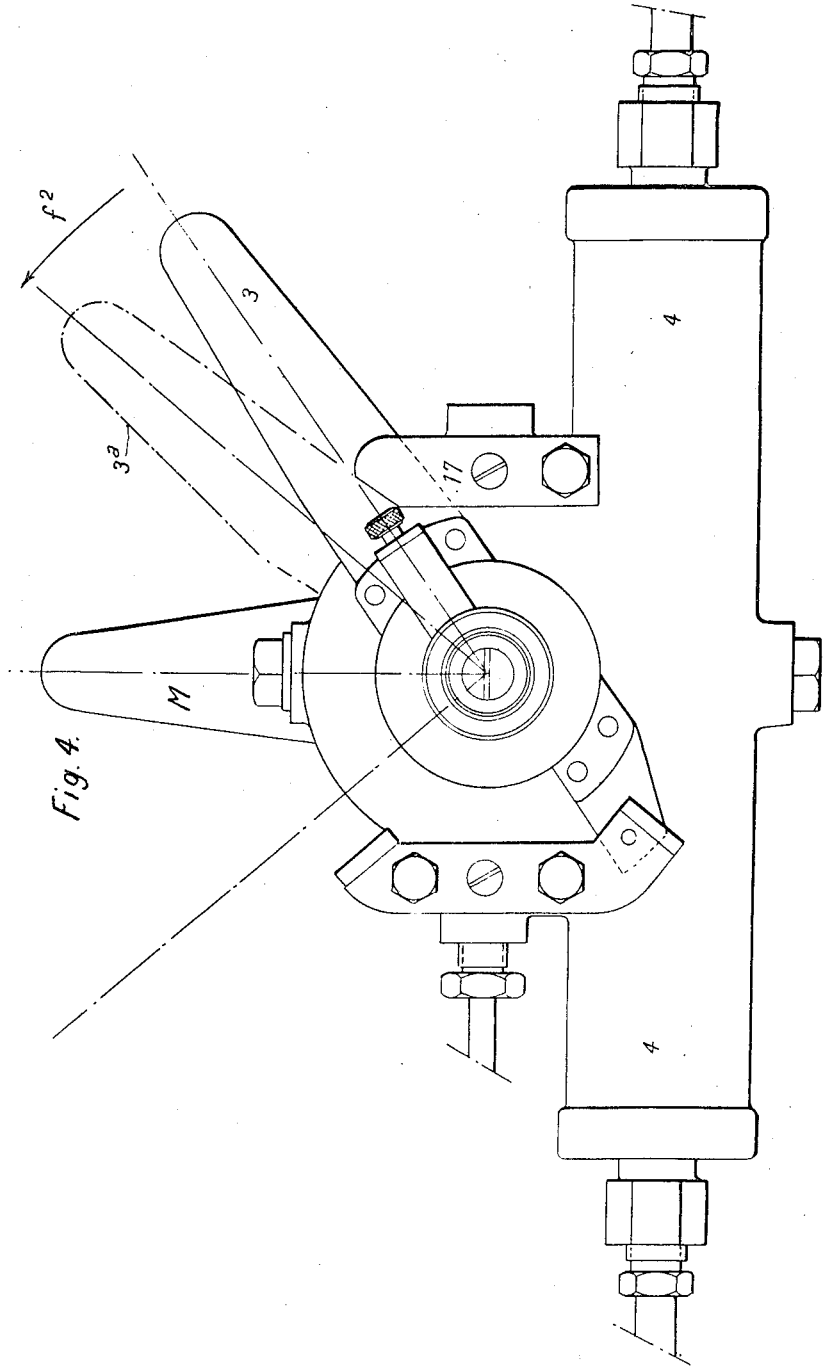

April 11, 1950
RENÉ LUCIEN LEVY
ALSO KNOWN AS
RENÉ LUCIEN
COMBINED HYDRAULIC AND EMERGENCY
MECHANICAL REMOTE CONTROL
2,503,498
Filed March 24, 1948
7 Sheets-Sheet 4
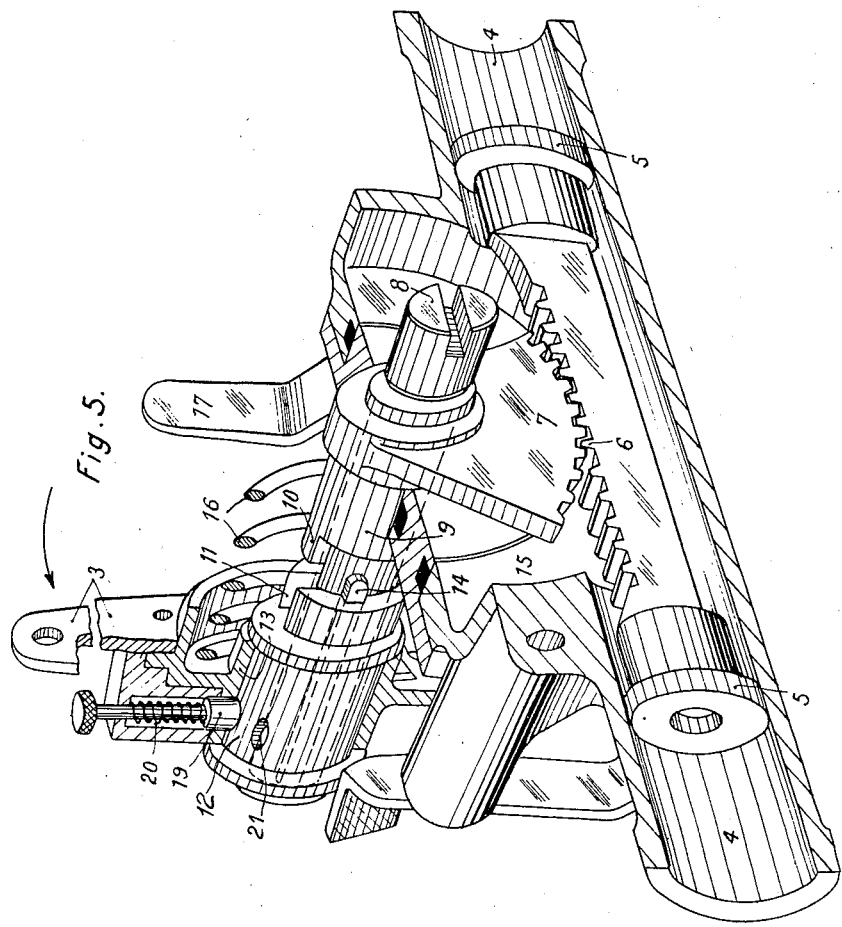
Inventor
Rene Lucien Levy
Also known as Rene Lucien

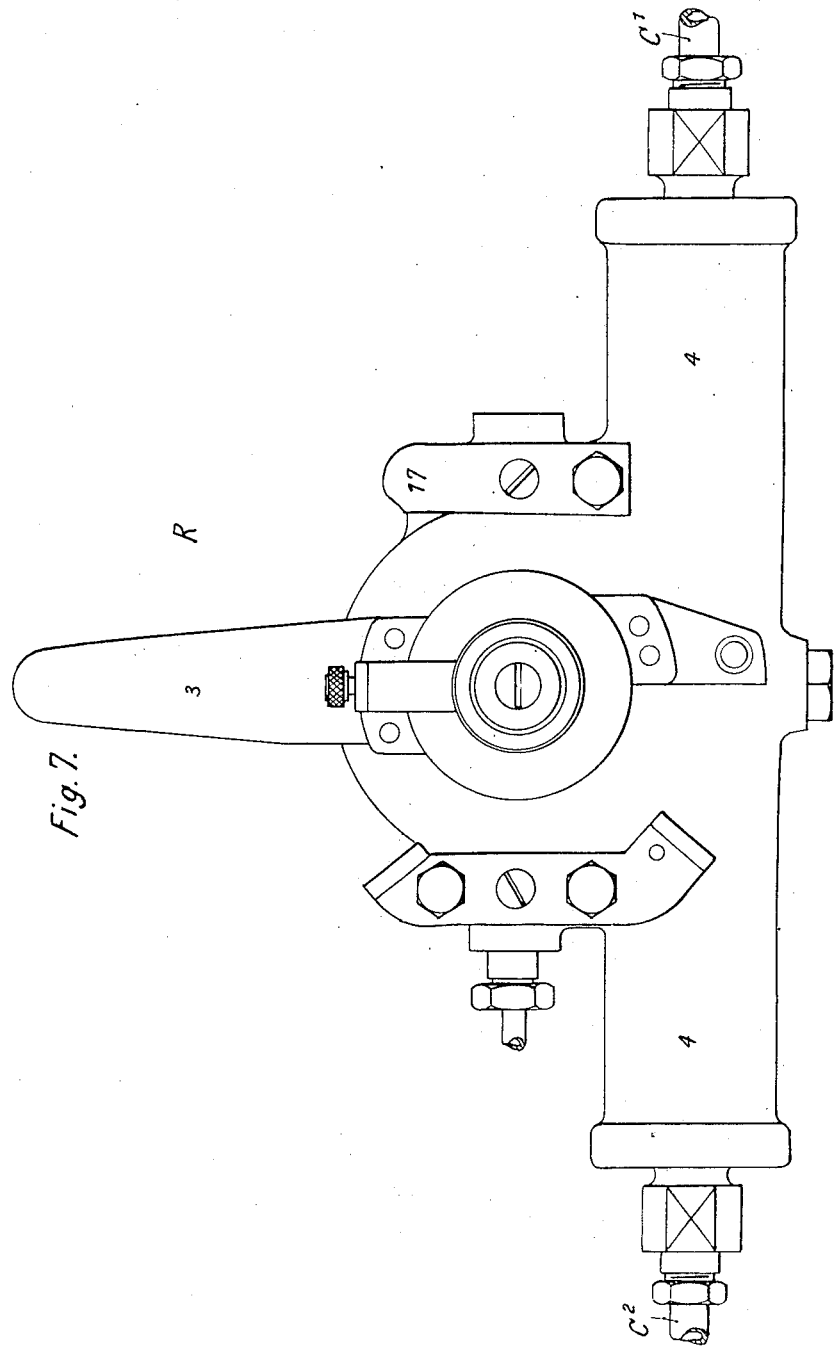

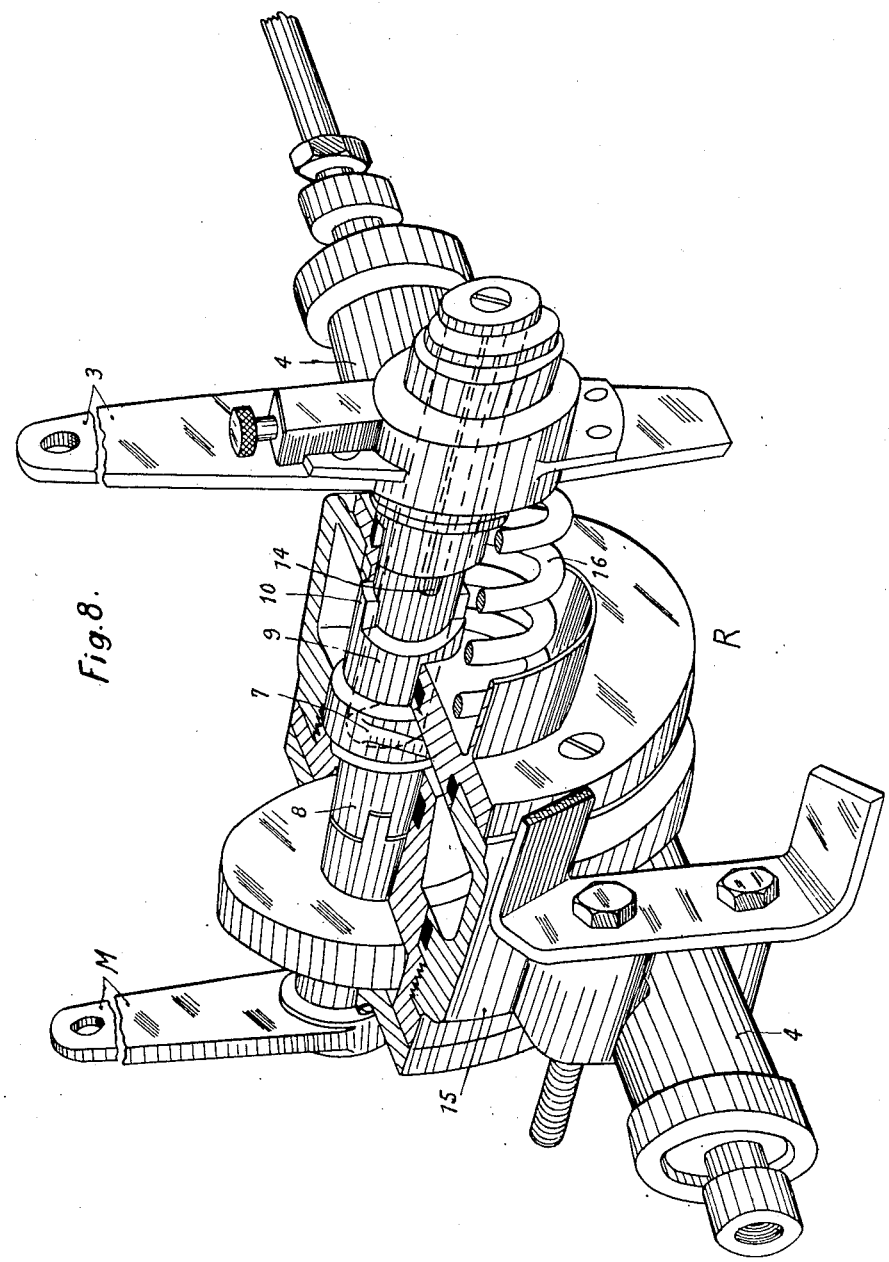

Patented Apr. 11, 1950

2,503,498

UNITED STATES PATENT OFFICE 2,503,498

COMBINED HYDRAULIC AND EMERGENCY MECHANICAL REMOTE CONTROL

René Lucien Levy, also know as René Lucien, Paris, France, assignor to Societe d'Inventions Aeronautiques et Mecaniques S. I. A. M., Geneva, Switzerland, a corporation of Switzerland Application March 24, 1948, Serial No. 16,784
In France November 27, 1947

2 Claims. (Cl. 74—469)

This invention has for its principal object the combination with a conventional remote control of a mechanical control to become a substitute for said first control when the latter is disabled by some operating defect, the substitution for the hydraulic control occurring then automatically as soon as the mechanical control is put into operation and this substitution being effected in a very short time.

Such a combined control for remote operations is adapted to multiple applications, particularly on planes or other aircraft.

Said combined control involves the following essential features:

First, the intermediate rotary gear, usually a sector gear which is driven by the hydraulic piston at the receiving station, is not rigidly connected to the driven shaft on which the lever, or the like, to be controlled is secured.

Second, during the periods of normal operation of the control, said intermediate gear drives through a slidable clutch having interengaged teeth or the like, a hub adapted to move axially and which causes in turn through a feather key, or the like, the angular movement of the receiving shaft.

Third, on said hub there is pivoted an emergency lever which is prevented from moving axially by means of a safety catch arm, or the like, during said periods of normal hydraulic operation.

Fourth, said emergency lever may be given partial rotations of variable amplitude by a mechanical control device located at the transmitting station and mechanically connected to said emergency lever, said mechanical control device, such as a hand lever, being in turn normally locked during the hydraulic operating periods.

Fifth, the angular movement of said emergency lever involves successively a first step of releasing the lever from its safety catch arm, a second step in which the lever is keyed to the hub by the automatic operation of a spring-loaded locking pin, and a third step in rotating the receiving shaft through the hub and the feather key.

Sixth, said emergency lever is continually urged by a resilient means, such as a spring, the expansion of which at the end of the first step causes an axial shift of the hub of the controlled lever, said shift causing in turn the release of an axially disengageable clutch between the receiving shaft and the sector gear of the hydraulic control which is thus disconnected.

One embodiment of the invention is shown in the annexed drawings, in which:

Fig. 1 is a general perspective diagrammatic view of the hydraulic remote control with the combined emergency mechanical control according to the invention.

Fig. 2 is a generally isometric view, with certain parts shown in section, of the hydraulic receiver provided with the emergency mechanical control the various parts being in their positions during normal hydraulic operation.

Fig. 3 is a longitudinal axial sectional view corresponding to the preceding view.

Fig. 4 is a corresponding end view.

Fig. 5 is an isometric view corresponding to Fig. 2 with the various parts being in positions preliminary to the initiation of operation of the mechanical control at the receiving station (first step).

Fig. 7 is an end view corresponding to the preceding view.

Fig. 8 is a generally isometric view corresponding to Figs. 6 and 7, but taken at 180° with respect to the other isometric views.

Figure 6:
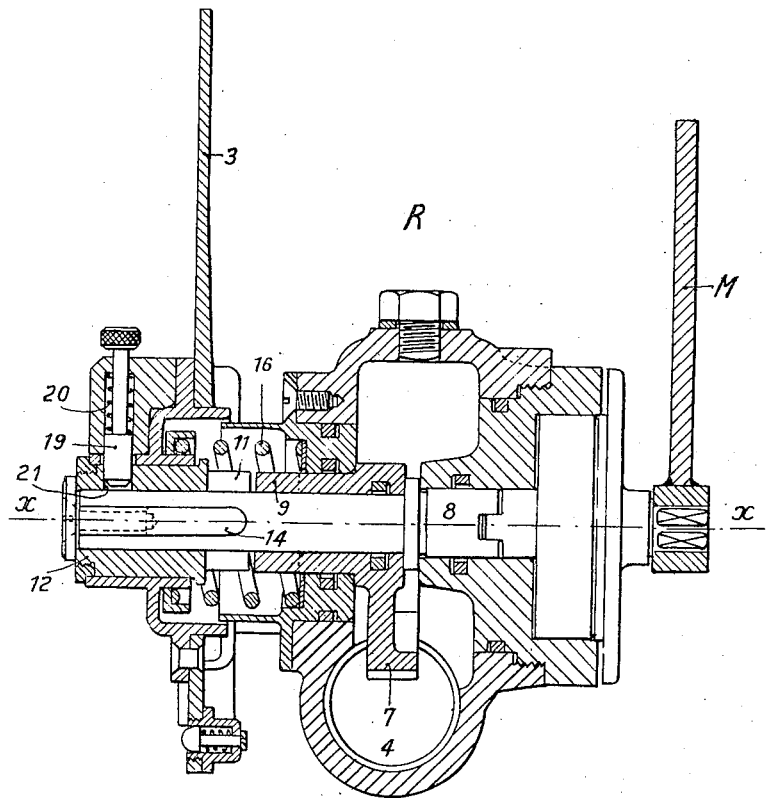
Fig. 6 is a longitudinal axial sectional view of the receiving station, the various parts being in the positions in which the mechanical control is in operation (second and third steps).

In said views various parts have been partly cut away in order to exhibit more clearly the inner structure of the mechanism.

In Fig. 1 the transmitting and receiving stations designated by reference letters T and R, respectively, are interconnected through hydraulic pipes C1 and C2 and are connected with an accumulator A. The hydraulic control is effected from post T by means of a hand lever $m$ the angular movements of which are reproduced by driven lever M which in turn drives the apparatus to be controlled (not shown).

The emergency mechanical control which according to the invention, duplicates said hydraulic remote control and which is known per se, is operated from the transmitting station by means of a lever 1 which is connected through a rod 2 with a lever 3 at the receiving station.

The hydraulic components of said receiving station are not modified in any way; these components, as previously, include a cylinder 4 within which a double acting piston 5—5 is slidable. As shown in Figure 2, said piston parts are connected by a rack 6 meshing with a sector gear 7.

According to the present embodiment of the invention, instead of being integral with driven shaft 8 to which the manually operated lever M is connected, said sector gear is disposed coaxially therewith along the line x—x and is freely mounted thereon.

Sector gear 7 has an axially extending sleeve 9 provided with one or more teeth 10, forming part of a clutch, which during the periods of normal operation of the hydraulic control (Figs. 2 through 4) are respectively engaged in recesses 11, forming the complementary part of the clutch, these recesses being provided in a hub 12 which is journalled in sleeve 13 of emergency hand operated lever 3.

Said hub 12 is in turn axially slidable on shaft 8 but is keyed against rotation with respect thereto by a feather key 14. Between sleeve 13 and frame 15 there is housed a spring 16 which is compressed during normal periods of hydraulic operation due to lever 3 being held inwardly by a safety catch arm 17 which is mounted on frame 15. This safety catch arm prevents said lever from moving axially in direction of the arrow $f1$, (Fig. 2). With this arrangement the hub 12 is caused to occupy on axis x—x a position in which recesses 11 are engaged by the teeth 10 so that the translation of rack 6 imparts rotation to the shaft 8, through the sector gear 7, teeth 10, hub 12 with the recesses 11 therein, and the feather key 14.

The substitution of operation in the hydraulic receiver of the emergency mechanical control is effected as follows, when, due to a defect having arisen, for example due to loss of liquid in the hydraulic transmission circuit C1—C2, the hydraulic control has become ineffective.

Emergency lever 1, being normally locked by a detent arm 18, said lever is first unlocked and given a certain degree of rotation, indicated as equal to 15° in the embodiment shown in the drawings as a mere illustration but which in any case must be sufficient, so that when rotated in the direction indicated by the arrow $f2$ (Fig. 4) by rod 2, the lever 3 will be released from its safety catch arms 17 and moved radially to the position 3a shown in dotted lines in Fig. 4.

At this time, lever 3, urged by expansion of spring 16, moves axially in the direction of the arrow $f1$ together with hub 12 so that the teeth 10 are disengaged from the recesses 11 of the clutch interrupting the drive which was connecting sector gear 7 with shaft 8 (Fig. 5); the hydraulic control is thus disconnected while shaft 8 is rotatively locked to the hub 12 due to feather key 14 on which said hub slides axially, but said hub is not so far rotatably connected to the lever 3.

By a further rotation in the same direction of control lever 1 lever 3 is rotated in the direction indicated by the arrow $f2$, and a locking pin 19 provided on said lever automatically engages in a socket 21 of the hub 12 which latter is thereby locked to the lever 3 in the proper position (Figs. 6 through 8).

The emergency mechanical control is thus engaged which brings into operation the linkage comprised by lever 1, connecting rod 2, lever 3, locking pin 19, hub 12, feather key 14 and shaft 8, said engagement being moreover effected in a very short time.

When the hydraulic control has been restored to operative condition, said control may be restored to normal operation by merely pushing by hand the hub 12 in the direction opposite to that indicated by the arrow $f1$ against the compression of spring 16, in order to re-engage the hub 12 with sector gear 7 by bringing the teeth 10 into the recesses 11 of the clutch and by simultaneously rotating the lever 3 so that said re-engagement may be effected.

When this operation has been completed, and by further pushing the hub 12 in the same direction to hold the spring 16 compressed, lever 3 is rotated in the direction opposite to the arrow $f2$ to cause it to again engage its safety catch arm 17.

Finally hand control lever 1 is relocked by means of its detent arm 18. The normal operation of the hydraulic control independently of the emergency mechanical control is thus again effected.

There is claimed:

1. A remote control combined with an emergency mechanical control comprising a transmitting station, a receiving station connected to said transmitting station, a movable element such as a double acting piston at the transmitting station, a receiving shaft, a lever to be controlled which is locked to said shaft, an intermediate rotary element driven by said movable element and coaxial with said shaft, an emergency lever rotatable with respect to and movable axially along said shaft, a hub adapted to be moved axially on said shaft but drivably connected for rotation therewith and connected to said emergency lever for axial movement therewith, a clutch comprised by complementary elements on said intermediate member and said hub, resilient means urging said emergency lever axially in the direction to disengage said clutch, an emergency control member at the transmitting station, a mechanical link interposed between said emergency control member and said emergency lever and adapted to rotate the latter, means to restrain in the axial direction said emergency lever for a given degree of its rotation, and means to lock, at a point of its rotation, said emergency lever to said hub.

2. In a remote control with an emergency control according to claim 1, means normally locking the emergency control member at the transmitting station.

RENÉ LUCIEN LEVY,
*Also known as René Lucien.*

REFERENCES CITED

The following references are of record in the file of this patent:

UNITED STATES PATENTS

| Number | Name | Date |
|---|---|---|
| 2,161,732 | Van Manteuffel | June 6, 1939 |
| 2,167,421 | Jann et al. | July 25, 1939 |
| 2,237,719 | Tiebel | Apr. 8, 1941 |
| 2,384,201 | Simpson | Sept. 4, 1945 |